Sept. 24, 1957 G. B. NICKOL 2,807,547
METHOD FOR AGING WHISKEY
Filed June 4, 1954 2 Sheets-Sheet 1

INVENTOR.
GORDON B. NICHOL
BY

Sept. 24, 1957  G. B. NICKOL  2,807,547
METHOD FOR AGING WHISKEY
Filed June 4, 1954  2 Sheets-Sheet 2

INVENTOR.
GORDON B. NICKOL
BY E. Janet Berry

United States Patent Office 2,807,547
Patented Sept. 24, 1957

---

2,807,547

METHOD FOR AGING WHISKEY

Gordon B. Nickol, Cincinnati, Ohio, assignor to National Distillers and Chemical Corporation, New York, N. Y., a corporation of Virginia Application June 4, 1954, Serial No. 434,495

8 Claims. (Cl. 99—48)

Figure 1:
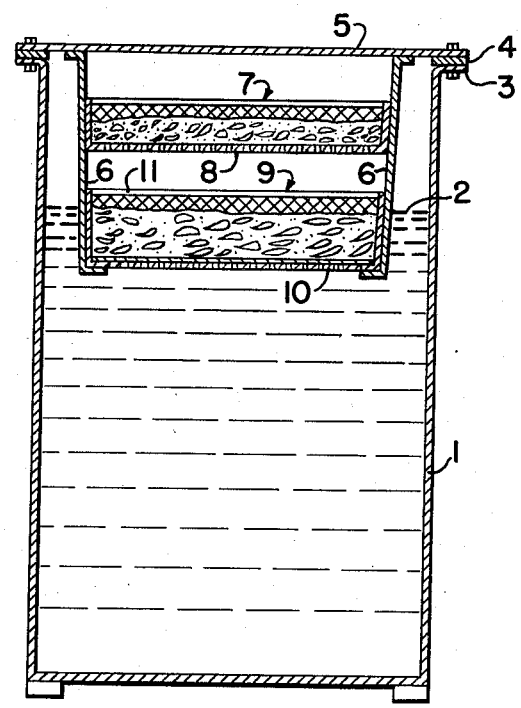
Figure 2:
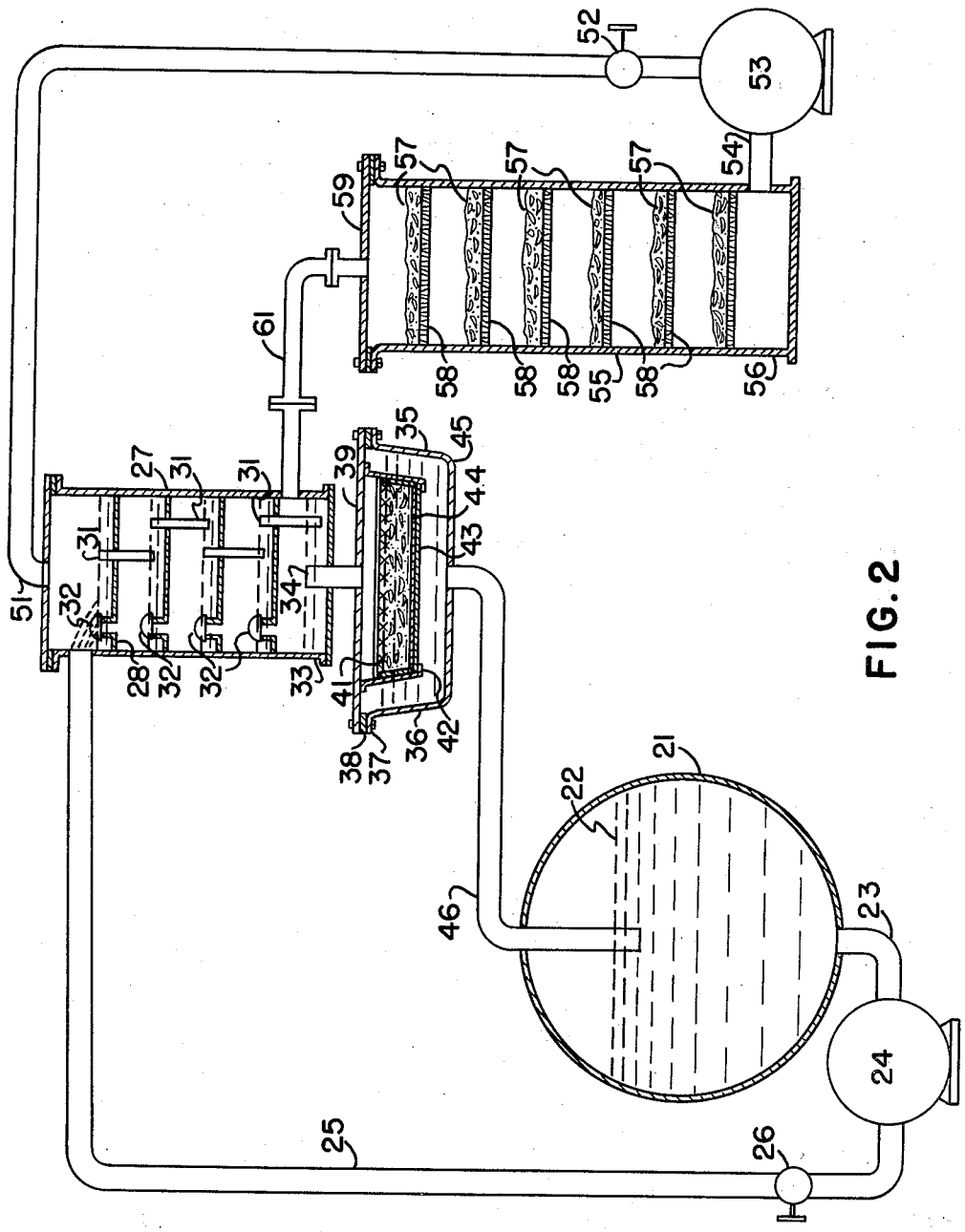

This invention relates to a new and useful method of aging whisky and will be fully understood from the following description read in conjunction with the drawings in which:

Fig. 1 is a diagrammatic vertical section through one form of apparatus in which the invention may be carried into effect; and Fig. 2 is a diagrammatic vertical section through an alternative form of apparatus in which the invention may be carried into effect.

In the present method of producing whisky a barrel of white oak wood is prepared by charring the interior to an extent and depth established by practice. An aqueous alcohol distillate (so-called high wine) derived from the fermentation of a cereal mash is introduced into the barrel which is then tightly sealed and held preferably under prescribed conditions of temperature and humidity for a period of years. During this time progressive changes occur, both in the extraction of certain constituents from the charred wood and in the reaction of other constituents originally present in the high wines, either with themselves or with constituents derived from the wood. Broadly speaking, the constituents which characterize the final product, in addition to the base of ethyl alcohol, are organic acids, aldehydes, fusel oil and organic esters together with coloring matter, the latter derived apparently from the char. While the relative amounts and even the exact effects imparted by each of these various constituents are not susceptible to rigorous mathematical evaluation, the final product as modified by various empirically determined process factors has established consumer acceptance.

One disadvantage of the aging process described is that the barrels can only be used once for the production of a satisfactory grade of whisky which adds substantially to the expense, and the cost of handling liquids in containers of such relatively small size as compared to those used in other industries which handle liquids, is relatively excessive. Attempts have been made to dispense with the use of the charred oak barrels by storing the high wines in containers of stainless steel for example, and adding to the high wines so stored an amount of charred oak chips corresponding in ratio to those which would be presented to the high wines in barrel-aging practice, or alternatively to add to the high wines so stored a corresponding amount of the extractives obtained by the aqueous ethyl alcohol extraction of charred wood chips. These attempts have, however, not been successful, since the whisky so prepared is lacking certain essential flavoring constituents. If an attempt is made to correct this condition by the use of a larger amount of charred chips or extractives derived therefrom, the resulting whisky is over-balanced in certain other constituents and is therefore of inferior grade.

It is recognized that in the conventional aging process, the wood barrel is a semi-permeable membrane selectively permitting migration and escape of the water molecules, with a resulting gradual increase in proof of the liquid within. I have now discovered that it is a double acting permeable membrane, in which certain constituents of the uncharred and solid wood of the barrel, principally volatile acids, migrate selectively inward into the aqueous alcohol within the barrel, thereby introducing into the high wines certain of the constituents required in aged whisky and essential to consumer acceptance of the resulting product. I have further discovered that these same constituents, i. e., principally volatile acids, can be introduced into the high wines by passing air, nitrogen or an inert gas over comminuted wood whereby certain volatile constituents pass from the comminuted wood into the gas stream and thereafter passing in the gas stream over or otherwise into contact with the high wines. This may be carried out at or about normal temperatures and in any event below 140° F. While the process requires time, by the use of sufficient wood and a substantial degree of comminution, the introduction into the high wines of the desired amount of such constituents can be effected in a fraction of the time required for the introduction of a corresponding amount under present aging practice. I simultaneously or subsequently add to the high wines an amount of charred wood chips substantially equal to that introduced in present aging practice, or alternatively an alcohol extract carrying a corresponding amount of the extractives derived from such chips. The amount of the comminuted solid uncharred wood required in this method will vary from 10 to 22.5% by weight of the high wines and together with the duration of the treatment by which the volatile constituents are transferred from the comminuted wood into the high wines, is preferably sufficient to introduce into the high wines from 500 to 1000 parts of volatile acids per each 1,000,000 parts of high wines.

Inasmuch as this method shortens the time within which these volatile constituents are being introduced, the overall time of aging is correspondingly reduced, and a mature whisky is produced in substantially less time than is required in accordance with present accepted practice. Moreover, it is no longer necessary to use wood barrels, and the aging can be carried out in drums of stainless steel or a similar material, which can be re-used indefinitely or alternatively can be carried out in large vats or tanks of the same or similar material, with corresponding economies in storage and in transfer.

Referring to the drawing (Fig. 1) drum 1 of circular horizontal section is charged with high wines, preferably of from 103 to 110 proof to level indicated by line 2. Drum 1 terminates at its upper end in horizontal flange 3 carrying gasket 4 by which a tight seal can be effected between drum 1 and cover 5. There is suspended from cover 5 by vertical straps 6 the basket 7 provided with foraminous bottom 8. Basket 7 is charged with a quantity of comminuted wood, preferably white oak, having a minor dimension which should not exceed ¼ inch and preferably does not exceed ⅛ inch. This wood is introduced with a ratio of from 10 to 22.5% by weight and preferably from 15 to 20%. Basket 7 is entirely above liquid level 2.

Basket 9 is also suspended from straps 6. The bottom 10 of basket 9 is foraminous. The upper level 11 of basket 9 is at or slightly above line 2. Basket 9 is charged with charred wood, preferably white oak chips. Inasmuch as direct contact of the liquid with the charred chips is desired, the chips should not extend above line 2. The chips are introduced in amount sufficient to impart the desired amount of extractives and color to the high wines. In ordinary practice, the charred chips will be introduced to the extent of from 1–3% by weight of the high wines and preferably between 1.5 and 2.5% by weight of the high wines. After the high wines, charred wood chips and uncharred comminuted wood have been introduced, cover 5 is sealed in position and the drum left in vertical position in storage, preferably at a temperature of 60 to 100° F. for a period of at least 24 months. During this period, extraction of the charred wood in basket 9 continues until the wood is completely or substantially completely extracted. During this period also, there is a gradual circulation of air by convection over the comminuted wood in basket 7 and thence over the surface of the high wines, with the result that volatiles diffuse from the wood into the air and are then selectively absorbed out of the air by the high wines. Nitrogen or an inert gas may, if desired, be used instead of the air, but this has not been found necessary. At the expiration of this period, the high wines in drum 1 will be found properly aged and will have the color and flavor which are characteristic of whisky. Variations in the over-all time of treatment and in the relative amounts of the comminuted uncharred wood and of the charred wood may, of course, be made within the broad scope of the invention to adapt the process to local tastes or to progressive changes in general taste.

Referring to Fig. 2, 21 is a tank, horizontally cylindrical, charged with high wines, preferably of from 103 to 110 proof to level indicated by line 22. Tank 21 is provided with bottom draw-off 23 connected to pump 24 by which liquid may be forced to pipe 25, controlled by valve 26, into the upper part of tower 27. Tower 27 is adapted for downward flow of liquid countercurrent to ascending flow of air or other gas and to that end is provided with horizontal trays 28 spanning the tower, each of which is provided with means for retaining a predetermined liquid level on the tray diagrammatically indicated by overflow pipes 31 and with means for dispersing the ascending gas into the liquid self-retained, diagrammatically indicated by bell caps 32. Liquid accumulating in base 33 of tower 27 is removed through overflow pipe 34 discharging into tank 35. The cylindrical side wall 36 of this tank is provided at its upper edge with horizontally extending flange 37 carrying gasket 38, which together with cover 39 forms a liquid and gas type seal. Basket 41 is suspended from cover 39 by vertical straps 42. Basket 41 is provided with foraminous bottom 43. Filter paper or cloth 44 rests on and covers the openings in foraminous bottom 43. Liquid passing through filter 44 into the bottom 45 of tank 35 is withdrawn through pipe 46 discharging into the upper part of tank 21.

Air or other gas passes off from the upper end of tower 27 by pipe 51 controlled by valve 52 into pump 53 by which it is forced through pipe 54 into base 56 of tower 55. Tower 55 is provided with a number of horizontal trays 58 spanning the tower. Each of these trays is foraminous and suitable means, not shown, is provided by which cover 59 may be removed and the trays 58, starting from the bottom, installed successively in position in the tower. In operating the apparatus, the trays are installed successively upward and as each tray is installed, it is charged with a layer of comminuted wood 57, preferably white oak, in the form of chips or other particles having a minimum dimension not exceeding ¼ inch, and preferably not exceeding ⅛ inch. Cover 59 is then sealed in place. The air or other gas discharged from pipe 54, moves upwardly in tower 55 in direct contact with the comminuted wood, with the result that volatiles diffuse from the comminuted wood into the ascending stream of air, and the air charged with the volatiles is conducted away through pipe 61, discharging into the base 33 of column 27. In moving upwardly in column 27 countercurrent to the descending high wines, the volatiles are selectively extracted from the air by the high wines, following which the air is recirculated through pipe 51. Nitrogen or an inert gas may be used instead of air, but this has not been found necessary. The circulation of the high wines upwardly through pipe 25 and thence downwardly through column 27 is maintained by means of pump 24. Basket 41 is charged with comminuted charred wood, preferably white oak, and preferably in the form of chips. The high wines passing off through pipe 34 percolate over these chips, absorbing the extractives therefrom by direct liquid contact therewith, passing thence through filter 44 and thence back through pipe 46 to tank 21. The amount of charred comminuted wood in the basket 41 in normal practice will be from 1 to 3% by weight of the high wines to be treated, and preferably 1.5 to 2.5% by weight. The total amount of charred wood may, if desired, be introduced in a number of successive batches rather than a single batch. The total amount of the comminuted uncharred wood in tower 55 will, in ordinary practice, be from 10 to 22.5% of the high wines to be treated, and this may also be supplied in a single batch or in a number of successive batches. A period of several weeks is required for complete transfer of the desired amount of volatiles from the comminuted wood in tower 27 into the high wines. A much smaller period of from 1 to 2 weeks will suffice for the complete extraction of the charred wood in basket 41.

At the end of the over-all treatment, the percent of volatile acids in the high wines should run between 500 and 1000 parts per million, and the total amount of all extractive should run between 1000 and 4000 parts by weight to 1,000,000 parts by weight of the high wines.

This application is a continuation-in-part of United States Application Serial No. 200,616, filed December 13, 1950, entitled "Method of Aging Whiskey."

EXAMPLE 1

A series of experiments were conducted to show the advantages achieved in using the invention. The resulting data are tabulated in Table I. The indicated analyses were carried out to determine effects realized from treatments of charred wood in high wines, uncharred wood above the high wines, and the combination of charred wood in the wines and uncharred wood carried out according to the invention. The results of these treatments are shown in comparison to the results obtained by aging in charred barrels for 4 years, the customary treatment for whisky. It is outstanding that the sample treated by this process compares closely with the conventionally aged whisky sample.

Table I

|  | Solids, g./100 liters | Volatile acids, g./100 liters | Total acids, g./100 liters | Esters, g./100 liters | Aldehydes, g./100 liters |
|---|---|---|---|---|---|
| Char in high wines | 182 | 30.0 | 42.0 | 10.0 | [2] 5.6 |
| Wood above high wines | 9.3 | 29.4 | 30.6 | 14.9 | [2] 0.0 |
| Char in and wood above high wines | 180 | 67.0 | 78.7 | 42.3 | [2] 8.8 |
| Average 4 year old whiskey [1] | 178.7 | -------- | 70.6 | 45.0 | 11.6 |

Analyses, calculated to 100 proof.

[1] Valaer and Frazier, Ind. Eng. Chem. 28, 92 (1936).
[2] These samples aged 2 years in crocks.

What I claim is:

1. An improved process of aging distilled liquors which comprises maintaining a liquid body of high wine in a closed receptacle at a temperature below its boiling point, said liquid body partially filling said receptacle whereby said liquid body is in contact with a gas phase, continuously maintaining in said gas phase within said receptacle and at all times completely out of contact with said liquid high wine a mass of uncharred comminuted wood enclosed in a gas permeable container and in an amount of from 10 to 22.5% by weight based on the amount of high wine, and continuously and simultaneously maintaining at all times in total contact with said liquid high wine a mass of charred wood enclosed in a liquid permeable container and in an amount of from 1 to 3% by weight based on the amount of high wine, and maintaining said liquid body in contact with said gas for a period of time sufficient for volatile matter in said uncharred wood to diffuse into the gas phase in an amount sufficient for said liquid phase to absorb from said gas phase an amount of said volatile matter equivalent to at least about 500 parts per million parts of said liquid.

2. An improved process for aging distilled liquors which comprises maintaining for a period of at least 24 months, a liquid body of high wine in a closed receptacle at a temperature between from 60 to 100° F., said liquid body partially filling said receptacle whereby said liquid is in contact with a gas phase, continuously maintaining in said gas phase within said receptacle and at all times completely out of contact with said liquid high wine a mass of uncharred comminuted white oak wood enclosed in a gas permeable container and in an amount of from 15 to 20% by weight based on the amount of high wine, and continuously and simultaneously maintaining at all times in total contact with the said liquid high wine a mass of charred wood enclosed in a liquid permeable container and in an amount of from 1.5 to 2.5% by weight based on the amount of high wine, during which period liquid high wine extracts the charred wood and volatiles diffuse from the uncharred wood into the gas phase and are thereafter absorbed from the gas phase by the high wine, thereby introducing into the high wine from 500 to 1000 parts of volatile acids per million parts of high wine.

3. In a process for aging distilled liquors comprising maintaining for a period of at least 24 months, a liquid body of high wine in a closed receptacle at a temperature below 100° F., the improvement which comprises in combination, the steps of maintaining said body of high wine in a receptacle of non-cellulosic material, said liquid body partially filling said receptacle whereby said liquid is in contact with a gas phase, continuously maintaining in said gas phase within said receptacle and at all times completely out of contact with said liquid high wine a mass of uncharred comminuted wood having a maximum minor dimension of ¼ inch and enclosed in a gas permeable holder and in an amount of from 10 to 22.5% by weight based on the amount of high wine, and continuously and simultaneously maintaining at all times in total contact with said liquid high wine a mass of charred wood enclosed in a liquid permeable holder and in an amount of from 1 to 3% by weight based on the amount of high wine, thereby transferring volatile acids that diffuse into the gas phase from the uncharred wood into the liquid high wine, and transferring extractable constituents from the charred wood until the high wine is mature.

4. In a process for aging distilled liquors comprising maintaining for a period of at least 24 months, a liquid body of high wine in a closed receptacle at a temperature below its boiling point, said liquid body partially filling said receptacle whereby said liquid body is in contact with a gas phase, the improvement which comprises in combination, the steps of continuously maintaining in said gas phase within said receptacle and at all times completely out of contact with said liquid high wine a mass of uncharred comminuted wood enclosed in a foraminous holder and in an amount of from 10 to 22.5% by weight based on the amount of high wine, and continuously and simultaneously maintaining at all times in total contact with said liquid high wine a mass of charred comminuted wood enclosed in a foraminous holder and in an amount of from 1 to 3% by weight based on the amount of high wine, during which period the high wine becomes mature.

5. An improved process for accelerating the aging of distilled liquors which comprises maintaining a liquid body of high wine in a closed receptacle, maintaining a mass of comminuted wood in a gas permeable container within said receptacle and in an amount of from 10 to 22.5% by weight based on the amount of high wine, and completely out of contact with said liquid high wine, and while so maintained, continuously passing a gas inert to said liquid high wine at a temperature below 140° F. for a prolonged period through a closed cycle including passage through said mass of comminuted wood and thence into contact with said liquid body of high wine, and continuously and simultaneously maintaining at all times in total contact with said liquid high wine a mass of charred comminuted wood in a liquid permeable container within said receptacle and in an amount of 1 to 3% by weight based on the amount of high wine.

6. A method for aging distilled liquors which comprises maintaining in a confined system (1) a body of a distilled liquor in liquid phase in contact with a body of a gas, (2) a mass of comminuted uncharred wood in said gas and out of contact with said liquid phase, and (3) a mass of comminuted charred wood in contact with said liquid for a period of time sufficient for volatile matter in said uncharred wood to diffuse into the gas in an amount sufficient for said liquid phase to absorb from said gas phase an amount of said volatile matter equivalent to at least about 500 parts per million parts of said distilled liquor.

7. A method, as defined in claim 6, wherein the liquid phase is maintained at a temperature of from about 60 to about 140° F.

8. A method, as defined in claim 6, wherein the liquid phase containing said volatile matter absorbed from said gas phase is maintained in contact with said gas phase until the liquor is mature.

References Cited in the file of this patent
UNITED STATES PATENTS

| | | |
|---|---|---|
| 156,253 | Jarvis | Oct. 27, 1874 |
| 489,337 | Spink | Jan. 3, 1893 |
| 675,173 | Spink | May 28, 1901 |
| 2,036,167 | Cox | Mar. 31, 1936 |
| 2,086,080 | Herrick | July 6, 1937 |